United States Patent [19]

Gothier et al.

[11] Patent Number: 5,174,625
[45] Date of Patent: Dec. 29, 1992

[54] LEVER-OPERATED LOCKING AND BRAKE MEANS FOR A TARP COVER SYSTEM

[75] Inventors: Richard J. Gothier, Indianapolis; Steven A. Henning, Anderson, both of Ind.

[73] Assignee: Aero Industries, Inc., Indianapolis, Ind.

[21] Appl. No.: 853,595

[22] Filed: Mar. 18, 1992

[51] Int. Cl.$^5$ .............................. B60P 7/02
[52] U.S. Cl. .................... 296/98; 242/86.52
[58] Field of Search ............... 296/98, 100; 242/86.52, 242/99, 75.4, 86.63, 86.64

[56] References Cited

U.S. PATENT DOCUMENTS

| | | | |
|---|---|---|---|
| 2,773,547 | 12/1956 | Voss | 296/98 |
| 3,549,197 | 12/1970 | Sibley | 296/100 |
| 3,549,198 | 12/1970 | Cappello | 296/100 |
| 3,549,199 | 12/1970 | Sibley | 296/98 |
| 3,628,826 | 12/1971 | Sibley | 296/98 |
| 3,977,719 | 8/1976 | Thurston | 296/98 |
| 4,082,347 | 4/1978 | Petretti | 296/98 |
| 4,252,362 | 2/1981 | Campbell | 296/98 |
| 4,893,846 | 1/1990 | Bailey | 296/98 |
| 5,054,840 | 10/1990 | Wilhite | 296/98 |

*Primary Examiner*—Robert R. Song
*Attorney, Agent, or Firm*—Laubscher & Laubscher

[57] ABSTRACT

A tarp cover system including a pawl (44) and ratchet (26) mechanism for locking a tarp cover (6) in a rolled-up truck-body-uncovered condition, and a brake operating lever that is initially pivoted in one direction with one hand by the operator to release the pawl from the ratchet to unlock the rolled up cover, and is subsequently pivoted in the same direction by the same hand to brake the unwinding of the cover as it is spring-biased toward the truck-body-covered condition. To re-cover the truck body, a crank shaft (24) is rotated to rotate the roll in the cover-winding direction against the biasing force of the cover spring, the ratchet mechanism preventing uncontrolled unwinding of the cover.

7 Claims, 3 Drawing Sheets

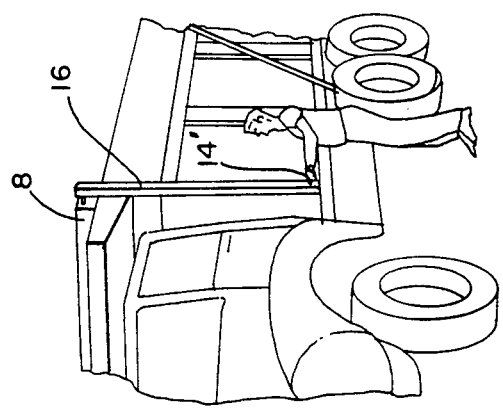
FIG. 6
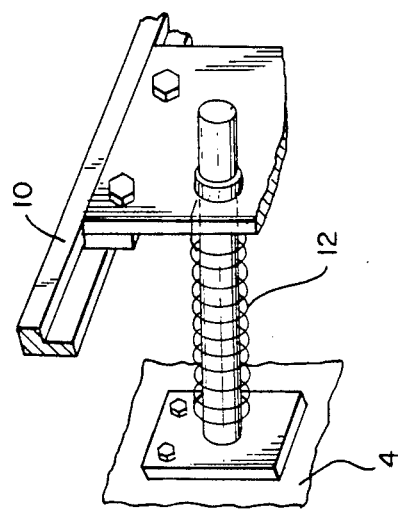
FIG. 7
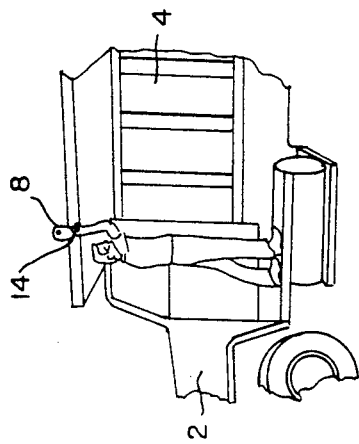
FIG. 4
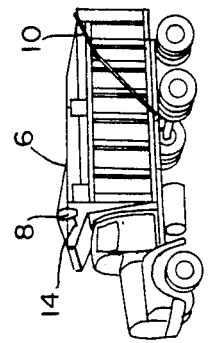
FIG. 5
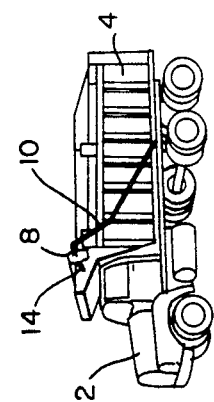
FIG. 1
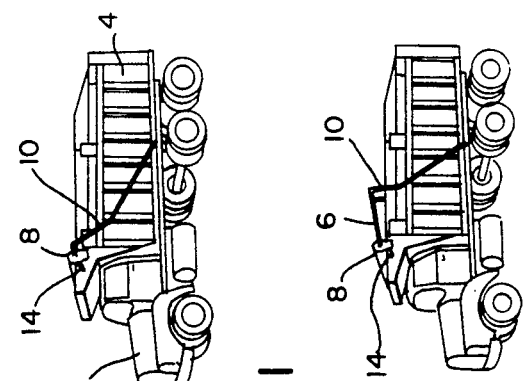
FIG. 2
FIG. 3

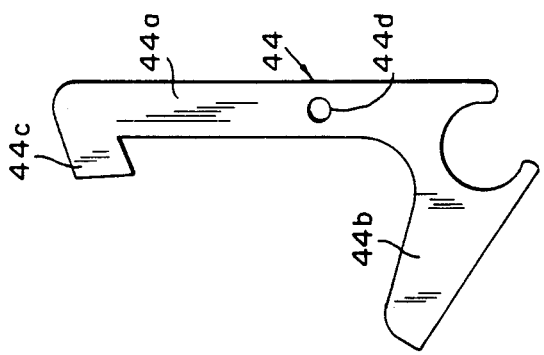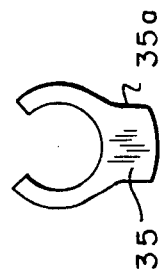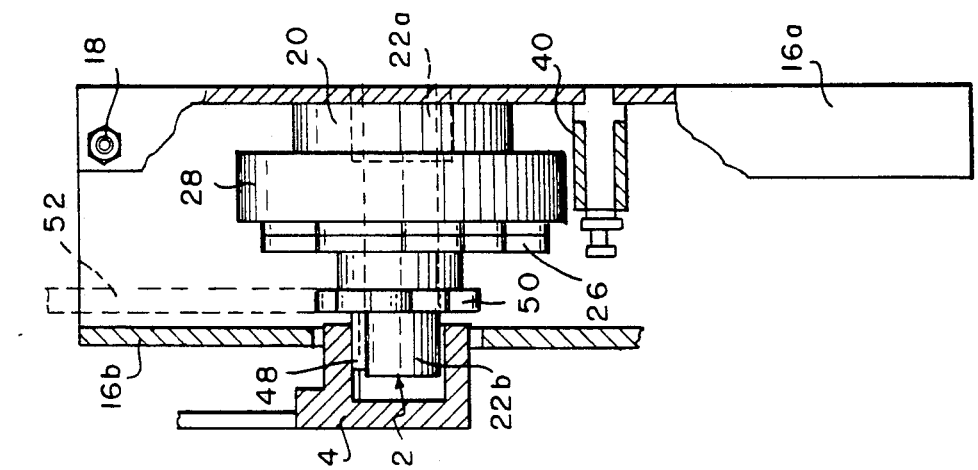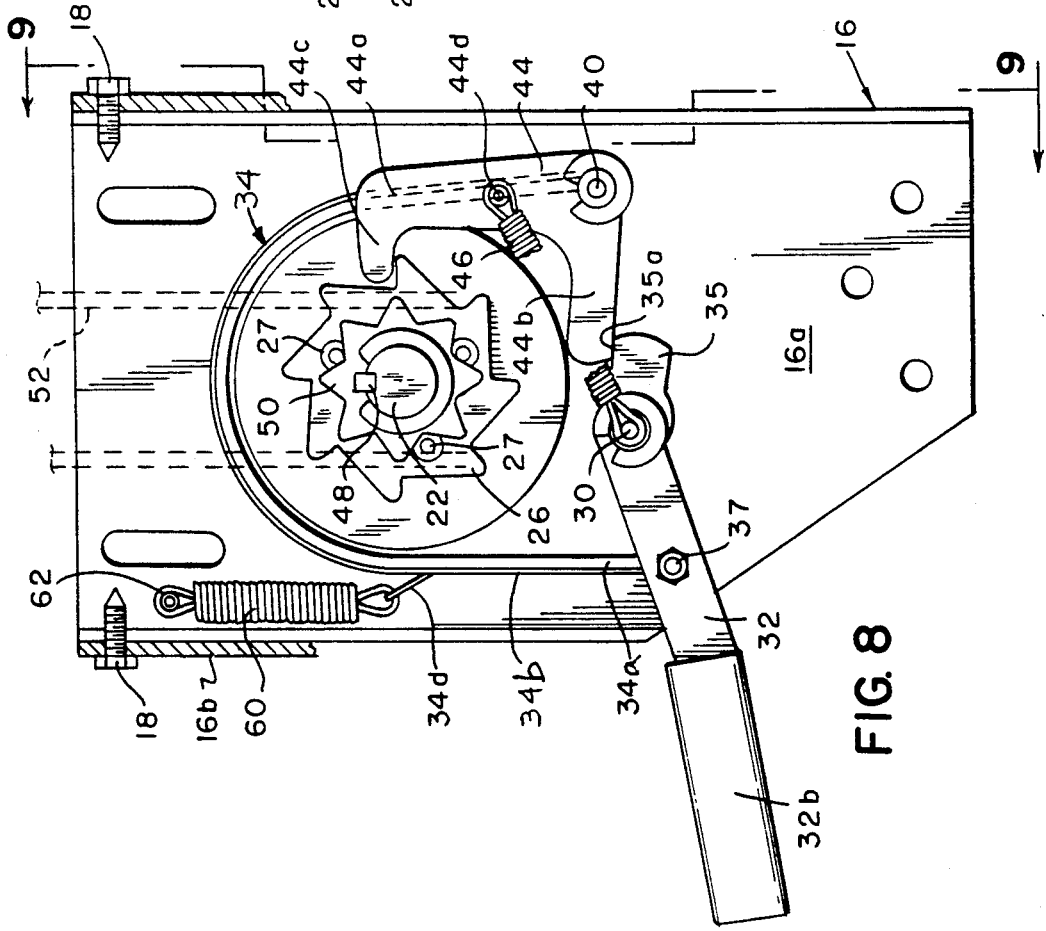

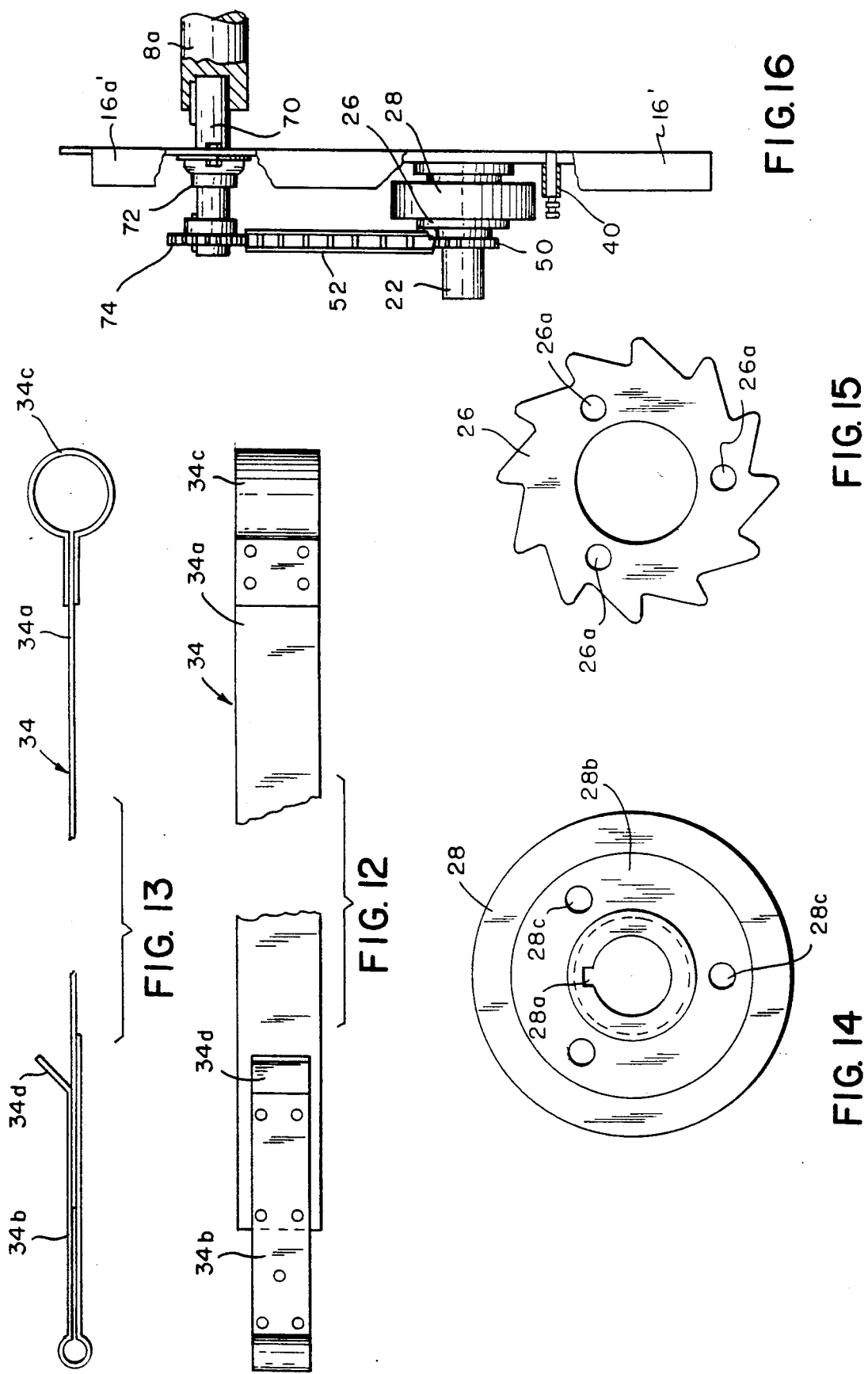

LEVER-OPERATED LOCKING AND BRAKE MEANS FOR A TARP COVER SYSTEM

CROSS REFERENCE TO RELATED APPLICATION

This application is a companion application to the Cohrs et al application Ser. No. 07/735,306 filed Jul. 4, 1991, entitled "Tarp Cover System With Lever-Operated Locking and Brake Means".

STATEMENT OF THE INVENTION

A tarp cover system for a vehicle having an open-top truck is provided including an improved brake lever arrangement for initially disengaging a pawl and ratchet locking mechanism to release a rolled-up tarp cover, and for subsequently braking the roll as the tarp cover is automatically unwound by spring biasing means connected with the free end of the cover. The brake lever arrangement is initially pivoted in one direction to cause cam means thereon to release the pawl, and is subsequently pivoted by the same hand in the same direction to brake in a controlled manner the unrolling of the spring-biased cover.

BRIEF DESCRIPTION OF THE PRIOR ART

In the U.S. Pat. No. 3,549,199 to Sibley, a tarp cover arrangement for trucks is disclosed in which a lever is pivoted in one direction to engage the teeth of a sprocket gear to lock the cover in a rolled up condition, and in the other direction to brake the cover roll as it is unwound by spring means connected with the free end of the cover. This known system has the drawback that use of both hands by the operator are required during the truck uncovering operation, since one hand is used to crank the roll against the force of the return spring biasing means, and another hand is required to pivot the lever in one direction toward the roll locking position in engagement with the sprocket teeth. Similarly, during the unrolling operation, the crank must be held by one hand of the operator while the lever is pivoted in the opposite direction toward the braking position in engagement with the hub portion of the sprocket gear.

The present invention was developed to afford an improved locking and braking arrangement that is operable in a simple efficient manner by the use of only one hand of the operator.

SUMMARY OF THE INVENTION

Accordingly, a primary object of the present invention is to provide an improved tarp cover system including pawl and ratchet locking means for locking a tarp roll in a partially or fully rolled-up condition, in combination with a brake operating lever that is initially pivoted in one direction by one hand of the operator to cause cam means on the lever to release the pawl and ratchet locking means, and is subsequently pivoted by the same hand in the same direction to brake the unwinding of the cover against the force of spring biasing means connected with the free end of the cover.

According to another object of the invention, the ratchet member of the locking means is mounted on the crank shaft of the operating means, whereby the roll is continuously locked against inadvertent unrolling even when in a partially rolled condition. In one embodiment the crank shaft is directly connected with the tarp cover roll, and in another embodiment, the crank shaft is connected with the tarp cover roll via sprocket gear and chain means, whereby the cover systems of large trucks may be operated by an operator standing at ground level.

BRIEF DESCRIPTION OF THE DRAWINGS

Other objects and advantages of the invention will become apparent from a study of the following specification when viewed in the light of the accompanying drawings, in which:

FIGS. 1-4 are perspective views illustrating the manner in which a tarp cover is unrolled to cover the open-top body of a truck;

FIG. 5 is a perspective view of the torsion spring biasing means for biasing the cover bail member toward the body-covered position;

FIGS. 6 and 7 are perspective views illustrating the operation of first and second embodiments of the invention, respectively;

FIG. 8 is a front elevational view, with certain parts broken away, of the cover operating apparatus of FIG. 7;

FIG. 9 is a sectional view, with certain parts removed for clarity, taken along line 9—9 of FIG. 8;

FIGS. 10 and 11 are plan views of the pawl and cam members of the apparatus of FIG. 8;

FIGS. 12 and 13 are top plan and elevational views, respectively, of the brake band means of FIG. 8;

FIG. 14 is a front elevational view of the brake drum means of FIG. 8;

FIG. 15 is a plan view of the ratchet of FIG. 8; and

FIG. 16 is a partially broken away side elevational view of a modification of the apparatus of FIG. 8.

DETAILED DESCRIPTION

Referring first more particularly to FIGS. 1-4, the tarp cover system of the present invention is adapted for use with a motor vehicle 2 having an open-topped truck body 4 that is to be covered by a flexible waterproof tarp cover 6. Initially, the tarp cover is rolled on a tarp cover shaft 8a (FIG. 16) to define a tarp roll 8 mounted for rotation adjacent one end of the truck body, the free end of the tarp cover being connected with a U-shaped bail member 10 the leg portions of which are pivotally connected at their extremities intermediate the ends of the truck body 4. Torsion spring means 12 (FIG. 5) bias the bail member rearwardly from the position of FIG. 1 to the closed position of FIG. 4, whereby the tarp cover is unwound from the tarp roll 8 to fully cover the truck body. In order to rotate the tarp roll 8 in the opposite direction and thereby wind the cover member on the roll, manually operable crank means 14 are provided adjacent one end of the tarp roll. As shown in FIG. 6, the crank means 14 may be mounted on the vehicle directly opposite the tarp cover roll, while in the second embodiment illustrated in FIG. 7, which is suitable for use with larger trucks, the crank means 14' is mounted at a lower elevation for operation by an operator standing on the ground, the crank means being connected with the tarp cover roll by sprocket gear and chain means 16, as will be described in greater detail below.

Referring now to FIGS. 8 and 9, the crank operating means 14 includes a housing 16 having a generally U-shaped rigid base portion 16a stamped from sheet metal, such as steel, and a removable U-shaped cover member 16b that is secured to the base 16a by means of screws or bolts 18.

Rotatably connected with the housing 16 by bearing means 20 (FIG. 9) is a crankshaft 22. At one end 22a, the crankshaft 22 extends through an opening contained in the bottom wall of the housing base portion 16a, and at its other end, the crankshaft 22 is adapted to be keyed in non-rotatable relation with the crank operating means 24, as shown in FIG. 9. Intermediate its ends, the crankshaft 22 has concentrically mounted thereon a ratchet member 26 and a brake drum 28, which members are non-rotatably connected with the crankshaft either by keying and/or welding.

Pivotally connected at one end with the housing 16 by means of pivot post 30 is a brake operating lever 32 connected intermediate its ends with one end of a curved flexible brake band 34 adapted for cooperation with the circumferential surface of brake drum 28. Cam member 35 is rigidly connected with one end of lever 32, as will be described in greater detail below. At its other end, the lever is bent to define a handle portion 32b.

Pivotally connected with the housing by pivot post 40 is a generally L-shaped locking pawl 44 having a pair of generally orthogonally arranged arms 44a and 44b the first of which carries a pawl tooth 44c. As shown in FIG. 8, pawl spring 46 connected between pivot pin 30 and pawl pin 44d on pawl arm 44a biases the pawl in the counterclockwise direction about pivot post 40, thereby to effect engagement between pawl tooth 44c and the teeth of ratchet 26.

Also keyed to crankshaft 22 by key 48 is the sprocket gear 50 which drives the sprocket chain 52 which in turn drives the cover roll 8, as will be described below with reference to FIG. 16.

As shown in FIG. 11, the cam member 35, which is secured to the end of lever 32 (by welding, for example), has a flat surface 35a for engagement with pawl arm 44b, as shown in FIG. 8. Thus, when brake operating arm 32 is pivoted in the counterclockwise direction about pivot pin 30, pawl arm 44b is engaged by cam surface 35a to pivot pawl 44 in the clockwise direction against the biasing force of spring 46, thereby to release pawl tooth 44c from ratchet 26.

As shown in FIGS. 12 and 13, the flexible brake band 34 includes a body portion 34a formed of a suitable non-asbestos braking material, such as that distributed by McMaster-Carr Supply Company of Chicago, Ill., and a pair of rigidly attached stainless steel end members 34b and 34c adapted for connection, respectively, with lever 32 by bolt 37, and with housing 16 via pawl pivot post 40. Tab 34d on end member 34b is angularly outwardly bent for connection with one end of brake biasing spring 60 the other end of which is connected with pin 62 secured to housing 16.

Referring to FIG. 14, the brake drum 28 contains a longitudinal key slot 28a by means of which it is keyed to crankshaft 22, and an end face 28b containing three equally spaced threaded holes 28c, and ratchet 26 contains corresponding openings 26a, whereupon the ratchet may be bolted to the brake drum end face by bolts 27, as shown in FIG. 8.

In the modified version of the invention shown in FIG. 16, the housing 16' is extended vertically to receive the idler shaft 70 journalled in bearings 72 contained in the base plate 16a' and connected at one end with crank shaft 22 via sprocket gear 50, sprocket chain 52, and idler sprocket 74. At its other end, the idler shaft is keyed to the corresponding end of tarp cover roll shaft 8a.

Operation

In operation, assume that the apparatus of FIGS. 8 and 9 is connected to the tarp cover roll shaft as shown in FIG. 7. To uncover the vehicle of FIG. 4, the operator turns the crank 24 to rotate crankshaft 22 and tarp cover shaft 8a in the clockwise direction, the pawl 44 riding in ratcheting engagement with the ratchet 26. As the cover is rolled upon the tarp cover shaft 8a, the bail 10 is pivoted forwardly against the restoring force of torsion spring 12, and when the cover has been rolled completely upon the shaft 8a, the truck body 4 is in the uncovered condition shown in FIG. 1. Pawl tooth 44c is now in engagement with a corresponding ratchet tooth to lock crank shaft 22 and cover roll shaft 8a against rotation in the cover-unwinding direction. Lever 24 is then removed from crankshaft 24a.

In order to cover the truck body 4, the operator merely pivots lever 32 in the counterclockwise direction about pivot 30, thereby to cause cam surface 35a to engage pawl arm 44b and thereby pivot pawl 44 in the clockwise direction about pivot shaft 40, whereupon pawl tooth 44c is disengaged from the ratchet 26. Owing to the restoring force of torsion springs 12, the bail member 10 is progressively pivoted rearwardly to displace in the rearward direction the free end of the cover member secured thereto. During this unwinding of the cover, lever arm 32 is pivoted in the counterclockwise direction about pivot post 30, thereby to cause brake band 34 to engage the periphery of drum 28 and retard the rotation of tarp cover shaft 8a in the unwinding direction. According to an advantage of the invention, as shown in FIG. 6, the operator may pivot lever 32 to effect the desired braking of crankshaft 22 and roll shaft 8a by the same hand that was used to initially pivot lever 32 to disengage pawl 44 from ratchet 26. The braking of the drum and crankshaft 22 is controlled by pivotal movement of lever 32 in the counterclockwise direction in FIG. 8. The extent of movement of lever 32 in the clockwise direction is limited by the length of the flexible brake band 34.

In the event the apparatus of FIGS. 8 and 9 were to be mounted on the truck body 4 at the upper position shown in FIG. 6, the necessity of the sprocket gear and chain is eliminated, and the right hand end 22a of crank shaft 22 is coupled with the tarp cover roll shaft 8a via coupling shaft 68 (shown in phantom in FIG. 9).

While in accordance with the provisions of the Patent Statues the preferred forms and embodiments of the invention illustrated and described, it will be apparent to those skilled in the art that various changes may be made without deviating from the concepts set forth above.

What is claimed is:

1. A tarp cover operating system for use with a vehicle (2) having an open-top truck body (4) including pairs of opposed side and end walls respectively, a cover roll shaft (8a) rotatably connected with the vehicle above, and extending horizontally transversely across the truck body adjacent one end wall thereof, a cover (6) connected at one end with the roll shaft, and spring means (12) biasing the other end of the cover toward the other truck body end wall, comprising:
   (a) a housing (16);
   (b) crank means including a crank shaft (22) rotatably connected with said housing for rotation in a first direction to wind the cover on the cover roll shaft;

(c) brake means (34,28) connected with said housing and operable from a normal brake-released condition to a brake-engaged condition for resisting rotation of said crank shaft;

(d) pawl and ratchet means (44,26) connected with said housing and normally having an engaged condition for preventing rotation of said crank shaft in the opposite direction relative to said housing, said pawl and ratchet means being operable to a disengaged condition in which said crank shaft is released for rotation relative to said housing; and (e) brake operating means connected with said housing for initially operating said pawl and ratchet means to the disengaged condition and for subsequently operating said brake to the braking condition, thereby to brake the rotation of said crank shaft, said brake operating means including:

(1) a lever (34) connected with said housing for movement between brake-engaged and brake-disengaged positions relative thereto;

(2) cam means (35) connected with said lever for automatically releasing said pawl and ratchet means as said lever is displaced from said brake-released position toward said brake-engaged position; and (3) means (37) connecting said lever with said brake means for operating the same in the brake-engaged condition when said lever is in the brake-engaged position.

2. Apparatus as defined in claim 1, and further including brake spring means (60) connected between said housing and said brake means for biasing said brake means toward the brake-released condition.

3. Apparatus as defined in claim 2, wherein said brake means includes a cylindrical brake drum (28) connected with said crank shaft, and further wherein said brake means includes a flexible brake band (34) connected at its ends with said lever and with said housing, respectively, said brake band being in circumferential braking engagement with said drum when said lever is in the brake-engaged position.

4. Apparatus as defined in claim 3, wherein said pawl and ratchet means includes a ratchet (26) connected with said crank shaft, a pawl (44) connected with said housing, and a pawl spring (46) biasing said pawl into engagement with said ratchet.

5. Apparatus as defined in claim 4, wherein said pawl is generally L-shaped to define a pair of generally orthogonally arranged arms (44*a*, 44*b*) joined by a juncture, and means pivotally connecting said pawl at said juncture with said housing, one of said arms having a pawl tooth (44*c*) for engaging said ratchet.

6. Apparatus as defined in claim 5, wherein said cam means is connected with said lever and includes as cam face (35*a*) arranged for engagement with the other arm of said pawl.

7. Apparatus as defined in claim 6, and further including a sprocket gear (50) connected with said crank shaft, and chain means (52) connecting said sprocket gear with said cover shaft.

* * * * *